United States Patent [19]

Anderson

[11] 4,378,205

[45] Mar. 29, 1983

[54] OXYGEN ASPIRATOR BURNER AND PROCESS FOR FIRING A FURNACE

[75] Inventor: John E. Anderson, Katonah, N.Y.

[73] Assignee: Union Carbide Corporation, Danbury, Conn.

[21] Appl. No.: 138,759

[22] Filed: Apr. 10, 1980

[51] Int. Cl.³ .............................................. F23D 13/20
[52] U.S. Cl. .......................................... 431/5; 431/9; 431/187
[58] Field of Search .................. 431/10, 8, 5, 9, 12, 431/175, 178, 187, 188, 284, 351; 239/8, 419.3, 419.5, 422, 424.5

[56] References Cited

U.S. PATENT DOCUMENTS

| | | | |
|---|---|---|---|
| 1,603,462 | 10/1926 | Hechenbleikner et al. | 431/175 X |
| 2,217,518 | 10/1940 | Merkt | 158/1 |
| 2,458,542 | 1/1949 | Urquhart | 431/10 |
| 2,515,845 | 7/1950 | Van Den Bussche | 110/28 |
| 2,800,175 | 7/1957 | Sharp | 158/117.5 |
| 2,941,587 | 6/1960 | Hagy et al. | 158/99 |
| 3,092,166 | 6/1963 | Shepherd | 158/11 |
| 3,180,394 | 4/1965 | Conway | 158/7 |
| 3,209,808 | 10/1965 | Conway et al. | 158/7 |
| 3,209,811 | 10/1965 | Strang | 158/109 |
| 3,284,069 | 11/1966 | Levaux | 263/15 |
| 3,771,944 | 4/1973 | Hovis et al. | 431/284 |
| 3,781,162 | 12/1973 | Rudd et al. | 431/115 |
| 3,905,751 | 9/1975 | Hemsath et al. | 431/183 |
| 4,014,639 | 3/1977 | Froehlich | 431/353 |
| 4,023,921 | 5/1977 | Anson | 431/9 |
| 4,035,137 | 7/1977 | Arand | 431/285 |
| 4,050,879 | 9/1977 | Takahashi et al. | 431/186 X |
| 4,162,890 | 7/1979 | Hirose | 431/351 |
| 4,181,491 | 1/1980 | Hovis | 431/187 |

FOREIGN PATENT DOCUMENTS 2303280 7/1974 Fed. Rep. of Germany.
1215925 12/1970 United Kingdom.
2019553 10/1979 United Kingdom.

Primary Examiner—Samuel Scott
Assistant Examiner—Randall L. Green
Attorney, Agent, or Firm—Adda C. Gogoris; Lawrence G. Kastriner; Stanley Ktorides

[57] ABSTRACT

Process and apparatus for firing a furnace using oxygen or oxygen-enriched air as the oxidant gas, comprising injection into the furnace of a plurality of oxidant jets, through nozzles, in a spaced relationship to a fuel jet, at a velocity sufficient to cause aspiration of furnace gases into the oxidant jets before the latter mix with the fuel jet, in amounts sufficient to lower flame temperature.

5 Claims, 9 Drawing Figures

OXYGEN ASPIRATOR BURNER AND PROCESS FOR FIRING A FURNACE

BACKGROUND OF THE INVENTION

This invention relates to a process and apparatus for firing an industrial furnace of the type in which at least the combustion zone is either not open to the atmosphere or substantially insulated therefrom, e.g. by a pressure difference, and which is commonly used for heating materials such as metals (e.g., a bar reheat furnace, a soaking pit, or an aluminum melting furnace), glass, etc. More particularly, this invention relates to a furnace firing method and apparatus which utilize oxygen or oxygen-enriched air as the oxidant gas instead of air.

It is common practice for air to be employed as the oxidant gas in industrial furnaces of the type described above. It is also known that oxygen enrichment of the oxidant gas for combustion, by substitution of oxygen in place of part or all of the air, can reduce the fuel requirements for and help increase the production rate of industrial furnaces. As oxygen replaces air for combustion, the nitrogen portion is correspondingly reduced in both the oxidant and the flue gas, thus reducing the total volume of each, on a per-unit-of-fuel-burned basis, and increasing the oxygen concentration of the oxidant-fuel mixture. These changes are, in turn, responsible for the following principal advantages:

(1) Increase in the maximum achievable firing rate for the burners of a given furnace, which can be used to augment production rate. With air as the oxidant, the firing rate may be limited by (a) the air that can be supplied to the burner through the available ducts and blowers, (b) the volume of combustion products that can be handled by the flue, and (c) the firing rate that can be tolerated by the burner, before combustion instability and incomplete combustion present problems. With an increase in the amount of oxygen, the lower oxidant and flue gas volumes overcome the first two limitations, while the lower oxidant volume and higher oxygen concentration help overcome the third limitation.

(2) Decrease in fuel consumption. With air as the oxidant, the sensible heat loss to the flue gas is often substantial due to the high nitrogen content of air. With oxygen enrichment, the nitrogen content of the flue gas is reduced and the heat content of the flue gas is decreased resulting in lower sensible heat losses at comparable off gas temperatures. The overall fuel savings per unit of production can be very significant.

(3) Decrease in pollution problems relating to entrainment of particulates, due to the lower flue gas volume. Gas cleaning of all pollutants is less costly and more effective with a decreased volume of flue gas per unit of fuel burned.

The extent of the above benefits increases with the degree of oxygen enrichment. Therefore, use of substantial oxygen enrichment as well as use of pure oxygen would be desirable in the art. Such use, however, has been avoided in the art to date, because it suffers from the following disadvantages:

(1) High flame temperatures. Flame temperature increases markedly as the oxygen concentration in the oxidant gas increases. This is undesirable because it results in (a) unusually high heat transfer rates in a localized region around the flame which can result in "hot spots" causing damage to the furnace refractory and/or the furnace charge, and (b) higher nitrogen oxide ($NO_x$) emissions, as the kinetics and equilibria of the $NO_x$ formation reactions are significantly favored by high temperatures. Use of pure oxygen as the oxidant gas does not solve the second problem by limiting the availability of nitrogen, because sufficient nitrogen is usually present in the furnace, through air leaks (which are usually unavoidable, even in closed furnaces, especially in industrial scale operations) or in the fuel, to form nitrogen oxides in environmentally unacceptable quantities, i.e. in amounts exceeding the acceptable $NO_x$ emission standards.

(2) Low gas momentum in the furnace. The reduction in mass in both the oxidant and in the fuel, can result in a substantial reduction in the incoming oxidant gas and fuel jet momentum, which, in turn, reduces the amount of mixing and recirculation of the gases within the furnace. Good mixing and gas circulation in the furnace are necessary to obtain effective heat transfer and uniform heating of the charge as well as further to avoid localized hot spots.

Thus, although the aforedescribed advantages of using oxygen or oxygen-enriched air in place of air in industrial furnaces were known, such use was avoided because it was accompanied by the aforedescribed disadvantages. There exists, therefore, a need in the art for a process and apparatus for firing a furnace which permits use of oxygen or oxygen-enriched air as the oxidant gas, thereby taking advantage of the benefits such use affords, but which overcomes the disadvantages set forth above.

OBJECTS OF THE INVENTION

It is therefore an object of this invention to improve the overall performance and efficiency of industrial furnaces by (a) increasing the maximum furnace firing rate through increasing the rate of oxidant introduction into the furnace, (b) decreasing the furnace fuel requirements by decreasing sensible heat losses to the flue through elimination of at least a portion of the nitrogen, and (c) facilitate abatement of pollutants by decreasing the volume of the flue gas.

It is also an object of this invention to achieve the above objective through the use of oxygen or oxygen-enriched air in place of air as the oxidant gas.

It is a further object of this invention to improve the overall performance and efficiency of industrial furnaces through the use of oxygen or oxygen-enrichment, while at the same time avoiding the disadvantages of high flame temperature and low gas momentum resulting in high $NO_x$ emissions and a non-uniform furnace temperature distribution, respectively, which disadvantages normally accompany use of such oxygen or oxygen-enriched air as the oxidant gas.

It is another object of this invention to improve flame stability during combustion in an industrial furnace.

It is yet another object of the present invention to provide burner apparatus for carrying out the foregoing objects.

These and other objects of this invention will become apparent in light of the following description and accompanying drawings.

SUMMARY OF THE INVENTION

One aspect of the invention comprises a process for firing a furnace, comprising:

(a) providing a furnace zone substantially closed to the atmosphere;

(b) injecting into said furnace zone at least one jet of oxidant gas selected from the group consisting of oxygen-enriched air having an oxygen content of at least 30 percent by volume and oxygen, said jet having a diameter D at its point of injection, at a velocity, at said point of oxidant jet injection, sufficient to achieve such gas recirculation and mixing within said zone as to permit substantially uniform heating of the furnace charge, said velocity being at least equal to that given by the formula:

$$V = 5.7P - 70$$

where V is the velocity of the oxidant jet in ft/sec, and P is the oxygen content of the oxidant gas in volume percent;

(c) simultaneously with step (b), injecting at least one fuel jet into said furnace zone said fuel jet being separated from said oxidant jet by a distance X, said distance X being measured from the outer edge of said oxidant jet to the outer edge of said fuel jet, at their respective points of injection, and at least equal to that given by the formula:

$$X = 4D;$$

(d) causing aspiration of furnace gases from the vicinity of said oxidant jet into said oxidant jet, in an amount sufficient to achieve a flame temperature during subsequent combustion lower than the normal flame temperature; and (e) after said aspiration has taken place, mixing said oxidant jet with said fuel jet thereby causing a combustion reaction to take place.

A second aspect of the invention comprises burner apparatus (hereinafter referred to as the "oxygen aspirator burner") for use with oxygen or oxygen-enriched air as the oxidant gas in firing a furnace, comprising in combination:

(a) at least one oxidant gas nozzle of diameter D for injecting a jet of oxidant gas into said furnace chamber, said diameter being less than that given by the formula:

$$D = \frac{40}{(P-8)} \left(\frac{F}{N}\right)^{\frac{1}{2}}$$

where D is in inches, P is the percent oxygen content of the oxidant gas by volume, F is the burner firing rate in million BTU per hour (MMBTU/hr) and N is the number of oxidant nozzles; and (b) at least one fuel nozzle for injecting at least one fuel jet into the furnace chamber, said fuel nozzle being spaced from the oxidant nozzle most proximate to it a distance X, where X is measured from the edge of said fuel nozzle to the edge of said oxidant nozzle, and where X has a value at last equal to that given by the formula X=4D.

By practicing of the process of this invention, substantial fuel savings and increased production rate may be achieved compared with furnace firing processes using air, while sufficient gas momentum is created in the furnace to achieve the amount of mixing and gas recirculation within the furnace necessary for a substantially uniform temperature distribution, while at the same time the flame temperature is lowered so as to keep $NO_x$ emissions at levels below those acceptable by emission control standards.

The theoretical flame temperature, for a fuel and an oxidant, is the maximum temperature attainable in a flame (assuming an adiabatic process and instant and complete mixing of fuel and oxidant) resulting from the combustion of that fuel with that oxidant.

The term "normal flame temperature" as used herein shall mean the flame temperature actually attained in a furnace during the combustion of a certain fuel and a certain oxidant without aspiration of furnace gases taking place prior to mixing the fuel and the oxidant. Normal flame temperature shall be close to theoretical flame temperature (how close depends on the mixing and heat transfer conditions prevailing in such furnace). When the flame temperature in a furnace, wherein the process of this invention is being practiced, is compared to "normal flame temperature", such comparison is to be interpreted as being made with reference to a conventional furnace in a process using equivalent operating parameters, but no aspiration of furnace gas prior to mixing the fuel and the oxidant.

BRIEF DESCRIPTION OF THE DRAINWGS

DETAILED DESCRIPTION

Figure 1:
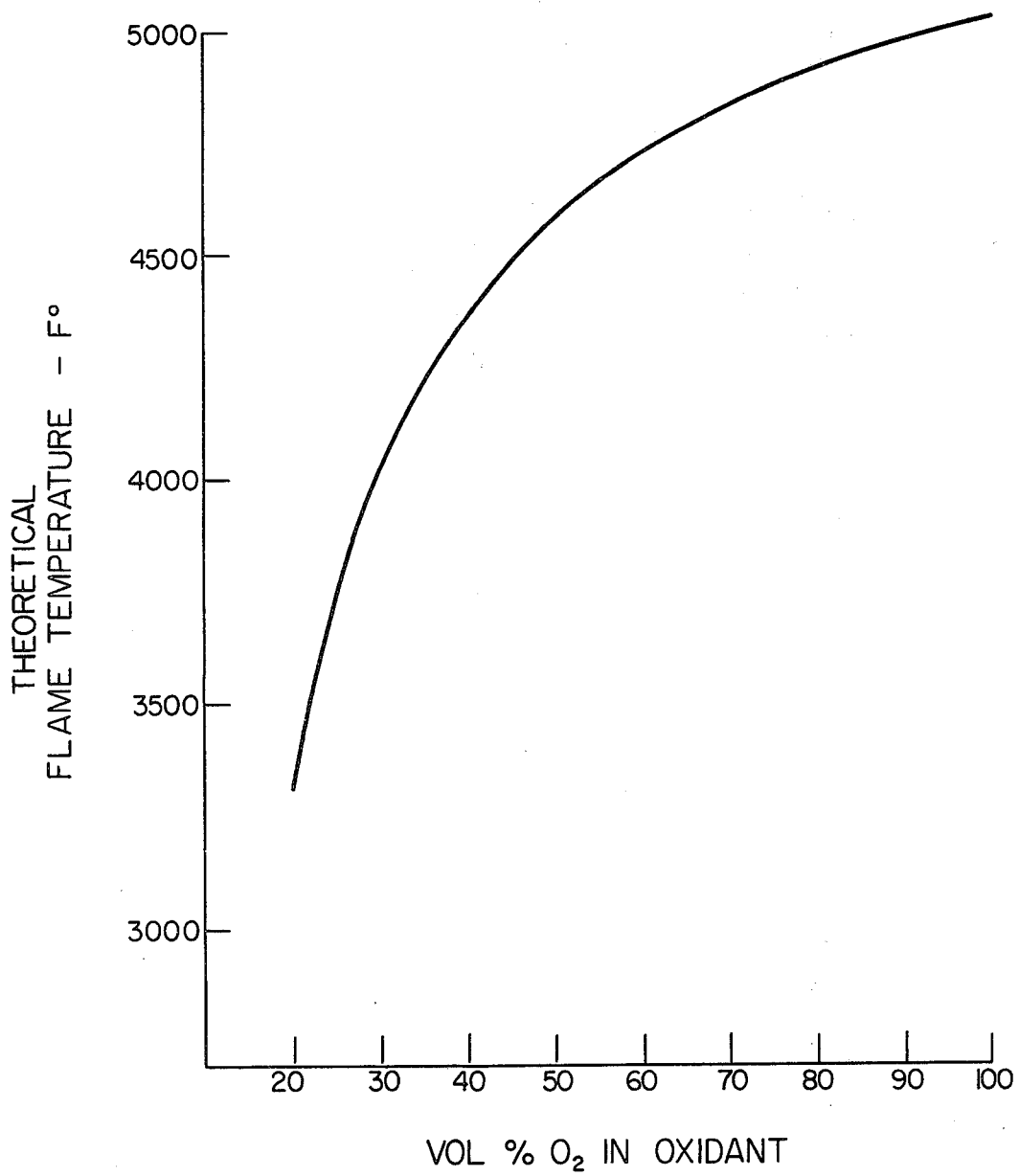
FIG. 1 is a graph depicting the variation of theoretical flame temperature for natural gas as a function of the oxygen concentration in the oxidant.

The description of the invention is given with reference to a particular embodiment, a method and apparatus for firing a furnace which furnace has a zone substantially closed to the atmosphere, such as is commonly used in the steel industry for the heating of a metal charge, or in other industrial combustion applications, e.g., in the glass industry for the heating of a glass charge, etc.

According to the present invention, the fuel and the oxidant jets are injected into the furnace from separate discharge ports. There may be only one fuel jet surrounded by a plurality of oxidant jets, there may be only one oxidant jet surrounded by a plurality of fuel jets, there may be one oxidant jet and one fuel jet, or there may be a plurality of both. An especially preferred embodiment contains one centrally located fuel jet surrounded by a plurality of circularly arranged oxidant jets (preferably 6 to 8). The distance (X) measured from the edge of the fuel nozzle to the edge of an oxidant nozzle, (or, in a different embodiment the distance between the edge of a fuel jet and the edge of the oxidant jet most proximately located thereto at their respective points of discharge) must be at least four times the diameter (D) of the oxidant jet or jets measured at the nozzle exit (i.e., the inside diameter of the oxidant nozzle).

The oxidant jets must be injected at a velocity sufficient to create an aspirating effect around and in the vicinity of each oxidant jet so that furnace gases, consisting essentially of combustion products and any non-oxygen portion of the oxidant gas, can be aspirated into said oxidant jets, directly from such vicinity, i.e. the space surrounding each oxidant jet (as distinguished from processes which use separate recirculation ducts and equipment to recirculate combustion products from a different part of the furnace, such as the flue). For the invention to be operable, such aspiration must take place before the oxidant and fuel jets mix. The amount of furnace gases aspirated up to a point in the oxidant jet at a distance Y from the oxidant nozzle exit (see FIG. 3b), is directly proportional to the mass flow rate of the oxidant jet, and inversely proportional to the diameter of the oxidant nozzle.

Distance X, as previously defined, must be at least 4 times the oxidant jet diameter at the nozzle and preferably at least 8 times the oxidant jet diameter. Tests run with distances X equalling up to 20 such diameters yielded satisfactory results. It has also been experimentally determined that, in general, at higher average furnace temperatures and at higher firing rates, a greater spacing between the oxidant and the fuel jet nozzles may be desirable in order, for example to keep $NO_x$ emissions below a certain level, as will be explained below.

The exit velocity of the oxidant jet must be sufficiently high to create the requisite aspirating effect. However, there is another factor which affects velocity and which is controlling in the present invention. As will be explained below, the velocity of the oxidant jet must be sufficiently high to create sufficient jet momentum at the exit of the oxidant jet. It is desirable that said oxidant jet momentum be at least comparable to that of an equivalent air jet in a conventional air burner and firing process.

As mentioned before, use of oxygen or oxygen-enriched air in place of air results in less gas mass input into the furnace (therefore less gas momentum) and higher flame temperatures. According to the present invention, aspirated furnace gases are required to play, in an oxygen or in an oxygen-enriched air system, the role previously played by nitrogen in an air system, namely to supply the mass necessary for gas mixing and recirculation and, as an inert component in the fuel combustion reaction, to act as a diluent and to decrease the flame temperature of fuel combustion. The substitution of nitrogen by hot furnace gases in the oxidant stream is to a considerable extent responsible for the fuel savings achieved by the present invention.

Therefore, the amount of furnace gas which must be aspirated into an oxidant jet for purposes of this invention depends on (a) the gas mass necessary for efficient mixing and gas recirculation within the furnace, assuming that the process of this invention will operate under mixing and gas recirculation conditions at least comparable to those of a conventional process using air, and (b) the flame temperature desired for the furnace so as to minimize $NO_x$ emissions and to prevent localized overheating.

Good mixing and gas recirculation are very important to accomplish uniform heating and also to avoid localized overheating and accompanying damage to the furnace charge, refractory, etc.

Without aspiration of furnace gases in the oxidant jet prior to mixing with the fuel, the flame temperature in the furnace, at the point where the oxidant and fuel mix, would be equal to the normal flame temperature which is close to the theoretical flame temperature (how close depends on the efficiency of mixing) for the particular type of fuel and oxygen content of the oxidant (see FIG. 1). Flame temperature increases with increasing oxygen content of the oxidant.

FIG. 1, depicts the variation of the theoretical flame temperature for combustion of natural gas as a function of the oxygen content of the oxidant gas, assuming complete and instant mixing conditions. As the concentration of oxygen increases, the theoretical flame temperature increases markedly from 3370° F. for air to 5030° F. (the adiabatic flame temperature) for oxygen. Of course, during actual operation of a conventional process, the temperature of the combustion products in the resulting combustion jet would be equal to the normal flame temperature at the point of mixing and would decrease along the length of the jet away from the burner as hot combustion gases mix with the cooler gases aspirating into the jet.

In industrial combustion applications it is important to control flame temperature for two reasons. First, high flame temperature favors kinetics and equilibria of $NO_x$ formation reactions; and second, high flame temperature may cause localized overheating with its accompanying undesirable effects (damage to furnace charge, furnace refractory, etc.). Aspiration of furnace gas into the oxygen jet prior to mixing with the fuel lowers the flame temperature below the normal flame temperature, and if the amount of furnace gas is sufficient (depending also on mixing conditions in the combustion zone and on the temperature of the furnace gas itself), the flame temperature will be sufficiently low so that neither overheating nor $NO_x$ formation present problems, even when pure oxygen is used as the oxidant gas. Measurement of the $NO_x$ emission enables one, theoretically, to estimate flame temperature.

The measured $NO_x$ levels obtained by use of this invention has been extremely low. The decrease of $NO_x$ levels may be attributed primarily to effective flame temperature control and only collaterally to oxygen enrichment (and therefore nitrogen depletion) of the oxidant gas. Flame temperature control is generally necessary because nitrogen is almost always present in a furnace, either due to air leaks or by being combined in the fuel, in quantities sufficient to form (within the prevailing furnace residence time conditions) significant amounts of $NO_x$ in the absence of flame temperature control.

Figure 2:
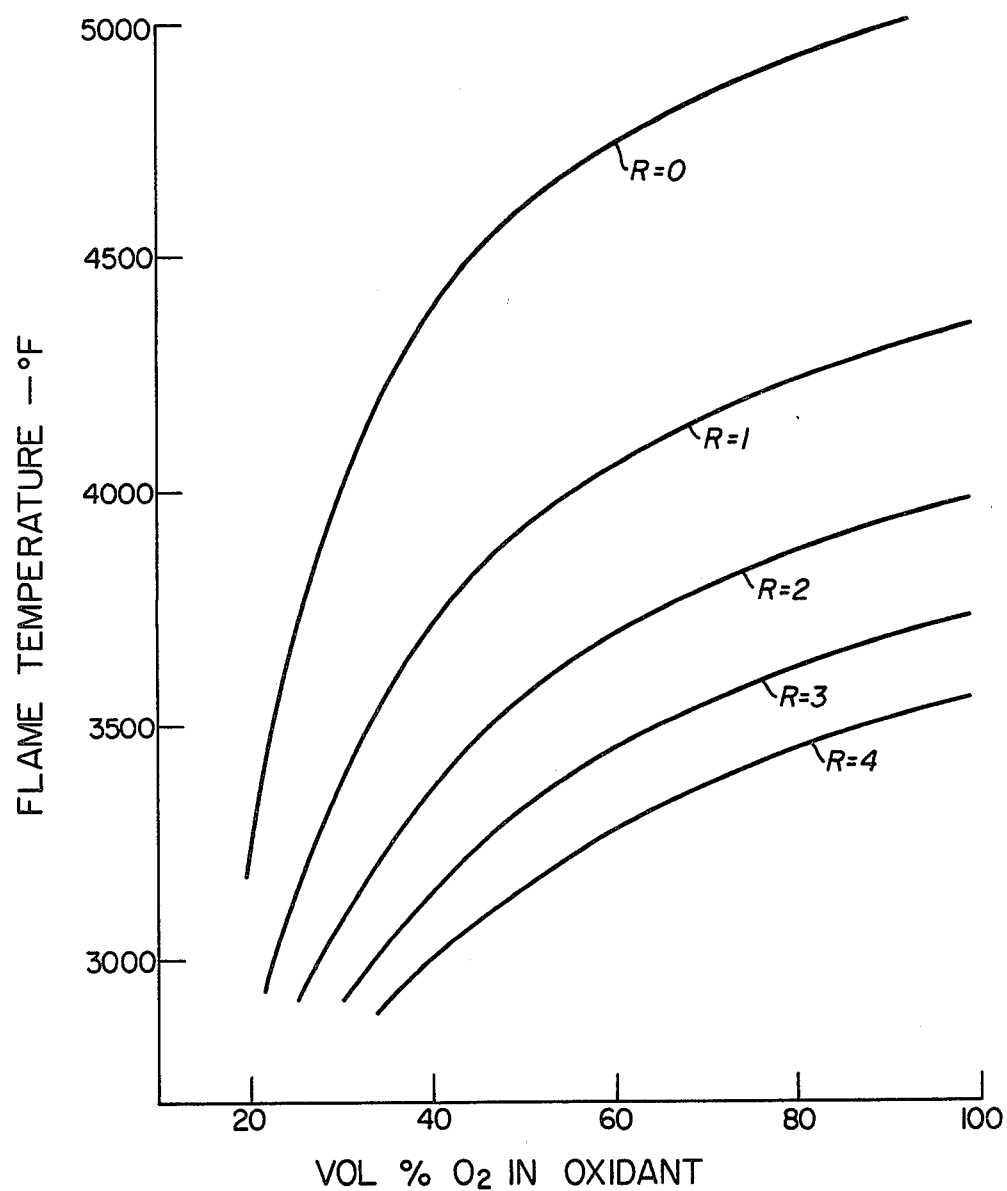
FIG. 2 is a graph depicting the flame temperature achieved in an oxygen aspirator burner using various degrees of oxygen enrichment in the oxidant gas for different furnace gas recirculation ratios.

As the amount of aspirated furnace gas increases in the oxidant jet of the oxygen aspirator burner prior to its mixing with the fuel jet the flame temperature decreases. The extent of flame temperature decrease depends also on the temperature of the furnace gas, but the flame temperature as a function of the amount of aspirated furnace gas bears the relationship depicted on FIG. 2 to the recirculation ratio R, defined as the ratio:

$$R = \frac{\text{weight of furnace gas aspirated into the oxidant jet prior to mixing with the fuel jet}}{\text{weight of oxidant plus fuel}}$$

By practice of the present invention it is desirable to achieve a flame temperature lower than the normal flame temperature by an amount of $\Delta T$ at least equal to that given by the formula: $\Delta T = 400 + 7.6\ (P-21)$; where $\Delta T$ is expressed in degrees F. and P is the oxygent content of the oxidant in volume percent.

When using oxygen or oxygen enrichment the mass of the oxidant jet is decreased, compared to that of an air system, for two principal reasons. First, elimination of part or all of the nitrogen mass because of oxygen enrichment; and second, lowering of the oxygen requirement for combustion, as the nitrogen which has been eliminated no longer has to be heated up. Therefore, the velocity of the oxidant jet must be increased in order for the jet to have sufficient momentum to achieve good mixing and gas recirculation in the furnace, which are necessary for uniform heat transfer within the furnace.

For purpose of this invention, the minimum oxidant gas velocity (measured at the mouth of the oxidant nozzle) necessary to achieve good mixing and recirculation should be greater than that given by the following empirical equation:

$$V = 5.7P - 70$$

where V is the oxidant gas velocity in ft/sec and P is the oxygen content of the oxidant in volume percent, assuming that mixing and recirculation achieved by this invention is to be at least as vigorous as that achieved in an air system.

Typically, the oxidant gas velocity for a conventional air furnace is of the order of about 50–100 ft/sec. A furnace using 100% oxygen and maintaining the same momentum as that of an equivalent air system would operate in an oxidant gas velocity range of about 450–950 ft./sec., assuming a fuel saving of 50%. In general, in order to achieve a momentum level comparable to or higher from that obtained in conventional air systems, the gas velocity should be at least 500 ft/sec and preferably higher than 800 ft/sec. The preferred velocity range is 450–1000 ft/sec.

Figure 3A:
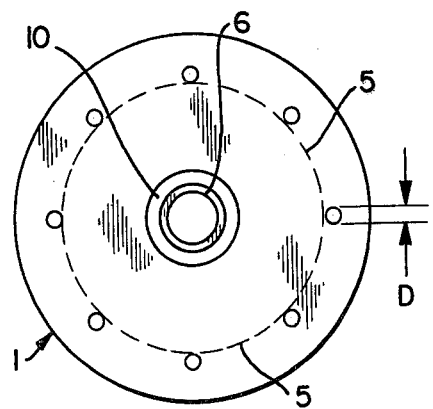
FIG. 3a is a schematic front view.
Figure 3B:
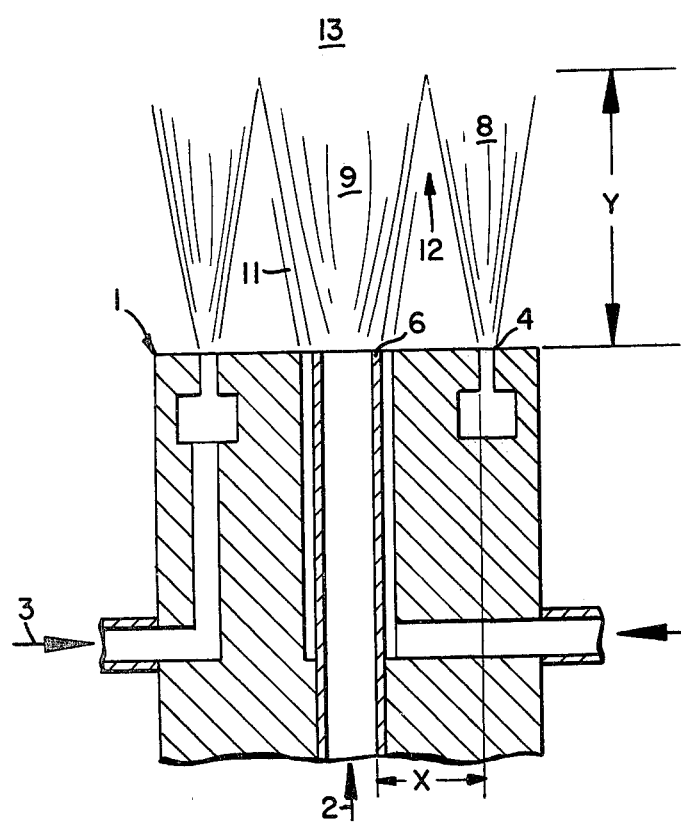
FIG. 3b is an axial cross-sectional representation of an oxygen aspirator burner for carrying out the process of this invention.

Schematically shown in FIG. 3a, is a front view of an embodiment of the oxygen aspirator burner of this invention incorporating features for practice of the process of this invention. FIG. 3b is a schematic representation of an axial view of the same burner. Burner 1 has a fuel feed 2 and an oxidant feed 3 leading to a plurality of oxidant nozzles 4 of diameter D. Oxidant nozzles 4 are evenly spaced about a circle 5 around the fuel nozzle 6 at a distance X from the edge thereof. It will be appreciated, however, that neither circular nozzle arrangements nor even spacing thereof are essential to the practice of this invention. Rather, such an arrangement and spacing represents a convenient embodiment. There are embodiments of this invention in which other arrangements, such as having the oxidant nozzles in parallel series at a distance X from and framing one or more fuel nozzles, or having an asymmetric oxidant nozzle arrangement which would render the flame reducing on one side and oxidizing in the other, etc., may be preferred. What is essential is that the distance X between a fuel nozzle and the most proximate oxidant nozzle be at least equal to four times the oxidant nozzle inside diameter D so that sufficient space is created between the corresponding jets to ensure aspiration of sufficient furnace gas into the oxidant jets 8 before the fuel jet 9 and oxidant jets 8 mix.

Preferably, the fuel nozzle 6 has flame stabilizing means associated therewith. In FIG. 3, fuel nozzle 6 has an annulus 10 around it, which is connected to the main oxidant feed 3, through duct 7, through which a proportionally small quantity of oxidant is injected so as to create an oxidant envelope (11) around the fuel jet thereby creating a continuous flame front and stabilizing the flame. 5 to 10% of the oxidant is sufficient for the oxygen envelope. A complete oxidant envelope is not necessary. It is sufficient to have a small quantity (5 to 10%) of the oxidant adjacent to the fuel jet so as to create a flame front.

In operation, the oxidant jets 8 and the fuel jet 9 are injected into the furnace. Because of the distance X between each of nozzles 4 and nozzle 6 a space 12 is created between jets 8 and jet 9 defined by the front of burner 1 at one end and by area 13 where the fuel and oxidant jets mix and combustion takes place at the other end. Furnace gases, which in the case where oxygen is used as the oxidant gas, essentially consist of combustion products (assuming efficient mixing and gas recirculation) are aspirated into the high velocity oxidant jets 8 from the vicinity of such jets including space 12. The oxidant jets 8 then mix with the fuel jet 9 to form a resultant jet (not shown) at area 13. Recirculating furnace gas finds its way into the vicinity of jets 8 including space 12 where it is again aspirated by oxidant jet 8 to effectively dilute the oxygen thereof. Thus, the process of this invention is able to use furnace gas as a substitute for nitrogen to achieve the same as or lower flame temperature than the normal flame temperature for a conventional system using the same fuel and the same oxygen content in the oxidant gas but no aspiration, and to maintain the same or higher mixing, gas recirculation conditions and temperature distribution uniformity without increasing $NO_x$ emission; in fact decreasing such emission.

The invention can be further illustrated by one or more of the Examples which follow:

Calculations and experiments were conducted using natural gas as the fuel, having the following composition and heating value:

| GAS COMPONENT | VOL. % |
| --- | --- |
| $CH_4$ | 96.0 |
| $C_2H_6$ | 1.6 |
| $N_2$ | 1.6 |
| $O_2$ | 0.3 |
| $C_3H_8$ | 0.3 |
| $C_3H_6$ | 0.1 |
| $i-C_4H_8$ | 0.1 |
| | 100.0 |

| Heating Value: | MMBTU (lb-mole) | BTU ($ft^3$ at 60° F.) |
| --- | --- | --- |
| (Gross) | 0.383 | 1010 |
| (Net) | 0.346 | 910 |

However, the invention may be practiced using other gaseous or liquid fuels, or a dispersion of solid fuel in a fluid medium, such as for example: methane, propane, diesel oil, as well as synthetic fuels such as a mixture of $H_2$ and CO.

Figure 6:
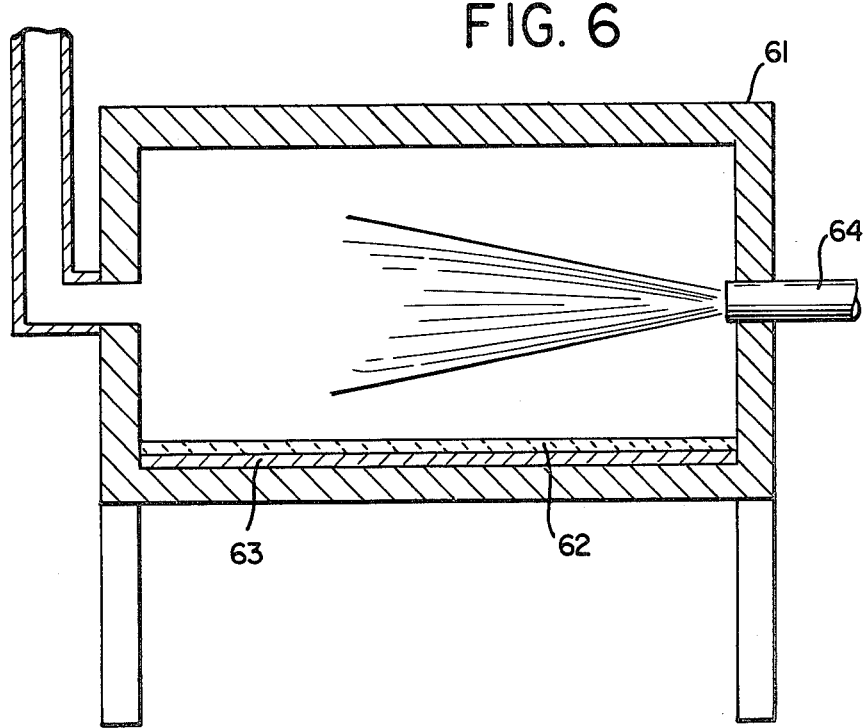
FIG. 6 is a schematic representation of a furnace in which the process of this invention can be practiced and the apparatus can be used.

The percent excess oxidant has been assumed such that the oxygen concentration in the flue is 2 volume percent. This is achieved at 111.6% of stoichiometric oxidant when using air and at 103.1% of such oxidant when using oxygen as the oxidant gas. The oxygen aspirator burner used was of the type shown schematically in FIGS. 3a and 3b. Oxygen nozzle diameters of 1/16 in., 3/32 in. and 1/8 in. were investigated. Tests were made using a total of six and eight nozzles equally spaced around a circle with the fuel nozzle axis at its center. The diameter of this circle was varied from 2 to 5 inches. Provisions were made to enable a portion of the oxidant to be passed through an annulus around the fuel nozzle to stabilize the flame. Different combustion parameters were investigated and compared with conventional practice in an experimental furnace 61, a sketch of which is shown on FIG. 6, designed to simulate industrial operation. The furnace was refractory-lined 62 with a heat sink 63 at the bottom and with inside dimensions of 4 ft.×4 ft.×8 ft. The output of the burners 64 when operating in the furnace was typically 0.5 to 1.0 MMBTU/hr.

Figure 4:
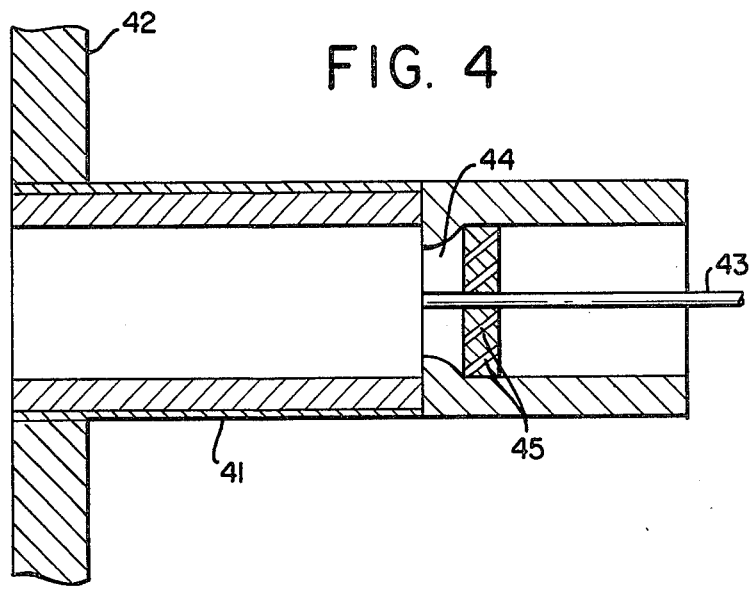
FIG. 4 is a schematic representation of an air burner with swirl flow and refractory block in axial section.

Three different type of burners were used: one incorporating the present invention described above and two other conventional burners, designated A and B shown schematically in FIGS. 4 and 5, respectively. FIG. 4 shows Burner A, a conventional swirl flow burner mounted on refractory burner block 41 (4 inch diameter, 11 inches length) of furnace wall 42 in a recessed fashion and incorporating a central fuel feed 43 (7/16 in. in diameter) surrounded by oxidant nozzle 44 (3 in. in diameter). Oxidant nozzle 44 contained swirl means 45 for imparting a tangential component to the oxidant flow which in conjunction with burner block 41 served to stabilize the flame.

Figure 5A:
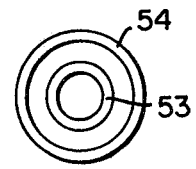
FIG. 5a is a schematic front view.

Burner B, shown in FIGS. 5a in front view and 5b in axial view, consisted of concentric jet nozzles, a fuel feed 51 enveloped by an oxygen feed 52. Center fuel nozzle 53 (0.242 in. inside diameter) surrounded by annular oxidant nozzle 54 (0.375 in. inside diameter, 0.625 in. outside diameter).

The invention is further illustrated in light of the following experimental results:

1. Operating Range Stability

Initially, the oxygen aspirator burner was used without the oxygen annulus surrounding the fuel stream. The burner operated unstably with the flame front oscillating back and forth between the back and front of the furnace. This caused the furnace to vibrate each time the flame front moved from the back to the front of the furnace towards the burner. By passing a portion of the oxygen (about 5–10%. of the total oxygen flow) through the annulus around the fuel feed, a continuous flame front was established near the burner face at the oxygen envelope—natural gas interface. This stabilized the combustion within the furnace, eliminating flame oscillations and furnace vibrations. The only visible flame front was that for the small flow of oxygen flowing through the annulus and reacting with a portion of the fuel. There was no visible flame front for the combustion reactions between the oxygen jets and the bulk of the natural gas. This is in contrast to conventional burners that have a well defined, visible flame.

The burner proved stable operating with oxygen jets having velocities up to 980 ft./sec. Higher velocities may also be possible. For example, in one set of tests using 560 ft$^3$ of natural gas and 1140 ft$^3$ of oxygen, eight oxygen nozzles of 1/16 inch diameter were used. About 7% of the oxygen was fed to the annulus to stabilize the flame and the remainder flowed through the nozzles. For these conditions, the oxygen velocity was calculated to be about 980 ft/sec at a pressure of 11 psig at the nozzle exit. The nozzle had a straight bore thereby preventing supersonic velocities within the nozzle. The oxygen leaving the nozzle would be expected to expand, attaining velocities in excess of 980 ft./sec. The burner operated stably for the nozzles at circle diameters of 2, 3.5 and 5 inches. It was found that the burner also operated stably with low velocity oxygen jets although this is of less practical interest.

The burner operated stably for a range of turndown conditions from high to low firing rates, the turndown ratio used being up to 20:1. In one set of tests simulating conditions in a specific industrial furnace, the furnace temperature was kept within a narrow range by operating the burner alternately at very high and very low firing rates. For example, in one of the tests, the burner operated at the firing rates given below:

|  | High Firing Rate | Low Firing Rate |
| --- | --- | --- |
| ft$^3$ Natural Gas | 1050 | 50 |
| ft$^3$ Oxygen to Nozzles | 2040 | 0 |
| ft$^3$ Oxygen to Annulus | 90 | 155 |

The flow rates alternated between the low and high firing rates via fast acting solenoid valves. The burner operated stably at both firing rates with no instability encountered during the change from high to low rates or vice versa. No limitations were found in the range of low and high firing rates tested that could be used for stable burner operation. This means that the burner stable operating range is wider than that used in the above tests.

2. Comparison with Conventional Swirl Burner

A comparison, based on nitrogen oxide ($NO_x$) formation, was made between the new oxygen aspirator burner and a conventional swirl burner. As shown in FIG. 4, the swirl burner incorporated tangential flow of the oxidant and a refractory burner block to stabilize the flame. The mixing of the oxidant and the fuel as well as the residence time in the refractory tube for this burner were such that the temperature of the combustion products was believed close to the theoretical flame temperature. The following $NO_x$ measurements were made in the flue gas when using the conventional swirl burner:

| Vol. % $O_2$ In Oxidant | Nitrogen Oxide in Flue Lbs/MMBTU |
| --- | --- |
| 21 | 0.044 |
| 30 | 0.19 |
| 90 | 0.41 |
| 100 | 0.10 |

For these tests the temperature of the combustion gases at the flue was in the range 2100°–2200° F. The firing rate was adjusted for each test condition to keep the furnace temperature and heat transfer rate to the sink approximately constant. Because of the fuel savings obtained when oxygen replaced part or all of the air for combustion, the firing rate decreased as the oxygen content in the oxidant increased. The data indicate that the $NO_x$ increased with increasing oxygen content in the oxidant up to 90% $O_2$. This was expected since the flame temperature also increased favoring both reaction kinetics and equilibria for forming $NO_x$. Between 90 and 100% oxygen, the $NO_x$ formation decreased due to the lower concentration of available nitrogen. In industrial furnace operation, the $NO_x$ formation when using 100% oxygen in a conventional burner would probably be much higher than that shown in the table, due to air leakage into the furnace. The $NO_x$ formation obtained at 90% $O_2$ in the experimental furnace may be closer to that which would be obtained with 100% $O_2$ in an industrial furnace, assuming a conventional burner is used in both instances.

When the oxygen aspirator burner using 100% oxygen was tested at comparable furnace conditions (approximately the same furnace temperature and heat transfer rate to the sink), the measured $NO_x$ was of the order of 0.001 lbs./MMBTU. For these tests, eight nozzles were used—1/16 inch diameter—in circle diameters of 2, 3.5, and 5 inches and ⅛ inch diameter nozzles in a circle diameter of 2 inches. The $NO_x$ formation for all conditions investigated was substantially below any known $NO_x$ emission regulations and standards. The resulting flame temperature when the furnace gases were aspirated into the oxygen jets prior to mixing with the fuel was apparently below that at which the kinetics for forming $NO_x$ would be significant.

3. Comparison with Conventional Concentric Jet Burners (Burner B)

Figure 5B:
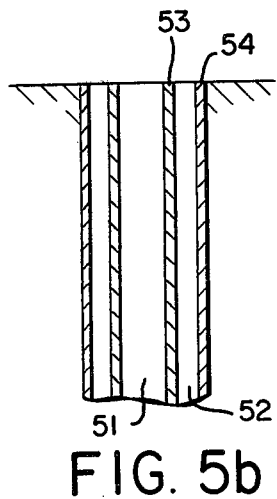
FIG. 5b is an axial cross sectional representation of a conventional concentric ring burner.
Figure 7:
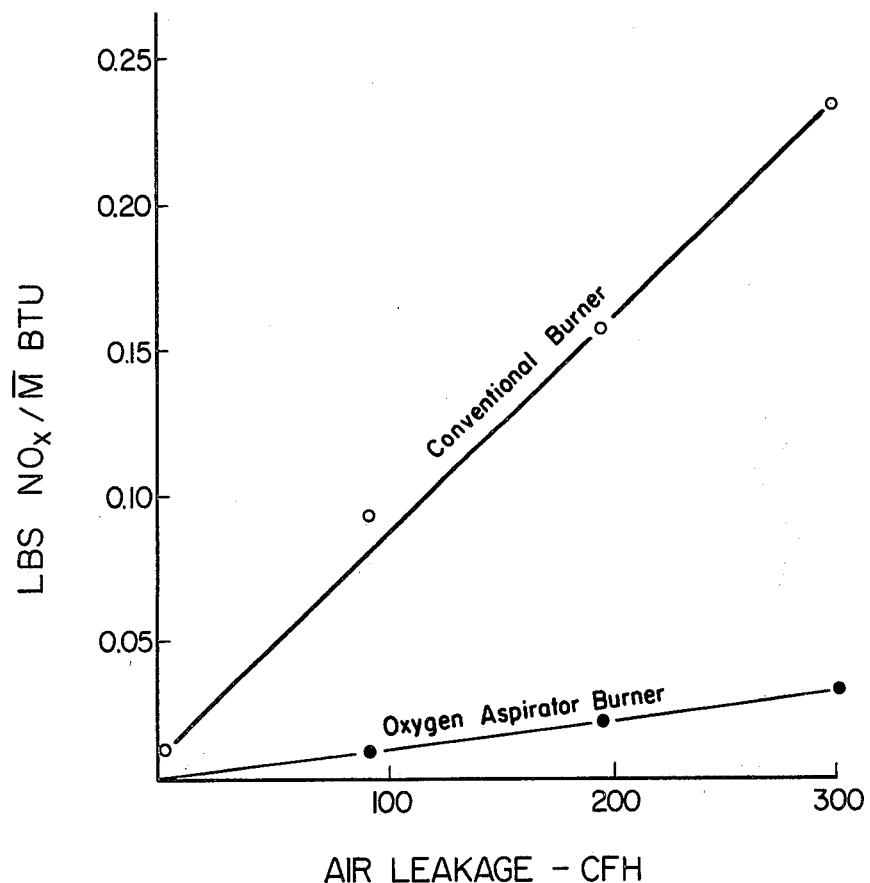
FIG. 7 is a graph comparing the $NO_x$ emission levels of an oxygen aspirator burner with those of a conventional concentric jet burner.

Tests were conducted comparing the new oxygen aspirator burner of this invention with a conventional burner consisting of concentric jets of fuel and oxygen. The oxygen aspirator burner had eight oxygen nozzles each of 3/32 inch diameter in a circle diameter of 2 inches. A sketch of the concentric jet burner is shown in FIGS. 5a and 5b. The tests were conducted at two conditions normally favorable for the formation of $NO_x$: high furnace gas temperature, and with air leakage into the furnace. For all test conditions, the firing rate was 815 ft³ of natural gas combined with 1670-1695 ft³ of oxygen. The furnace gas temperature was in the range of 2800°-2900° F.* The air leakage into the furnace was controlled from 0 to 300 ft³ of air. The results for $NO_x$ formation are plotted on the graph in FIG. 7.

* In commercial metallurgical applications, such as soaking pits or reheat furnaces, the average furnace temperature usually ranges from about 2000°-2500° F.

For both burners, the $NO_x$ emissions increased as the air leakage rate increased. However, at comparable test conditions, the $NO_x$ formation was almost an order of magnitude lower for the aspirator burner as compared to the concentric jet burner. The level of $NO_x$ emissions for the aspirator burner was always below any known emission standards for $NO_x$ for all test conditions investigated.

What is claimed is:

1. A process for firing a furnace by combusting fuel and an oxidant to produce furnace gases such that a flame temperature lower than the normal flame temperature is achieved, comprising the steps of:
   (a) providing a furnace zone substantially closed to the atmosphere;
   (b) injecting into said furnace zone at least one jet of oxidant gas through an orifice, said oxidant gas being selected from the group consisting of oxygen and oxygen-enriched air having an oxygen content of at least 30 percent by volume, said jet having a diameter D at its point of injection and a velocity at said point of oxidant jet injection at least equal to that given by the formula:

$$V = 5.7P - 70$$

where V is the velocity of the oxidant jet in ft/sec, and P is the oxygen content of the oxidant gas in volume percent;
   (c) simultaneously with step (b), injecting at least one fuel jet through an orifice into said furnace zone, the orifice of said fuel jet being located in substantially the same plane as the orifice of said oxidant jet, and said plane being perpendicular to the direction of at least one of said jets, the orifice of said fuel jet being separated from the orifice of said oxidant jet as measured in said plane by a distance X, said distance X being measured from the outer edge of said oxidant jet orifice to the outer edge of said fuel jet orifice and being at least equal to that given by the formula:

$$X = 4D;$$

(d) aspirating furnace gases from the vicinity of said oxidant jet into said oxidant jet; and
   (e) after said aspiration has taken place, mixing said oxidant jet with said fuel jet, thereby causing combustion to take place.

2. The process of claim 1, wherein the oxygen jet velocity ranges between about 450-1000 ft/sec.

3. The process of claim 1, wherein a plurality of oxidant jets are injected through nozzles spaced about the fuel jet.

4. The process of claim 1, wherein during step (d) the amount of furnace gases aspirated is sufficient to achieve a flame temperature during subsequent combustion lower than the normal flame temperature by an amount $\Delta T$ at least equal to that given by the formula:

$$\Delta T = 400 + 7.6(P - 21)$$

where $\Delta T$ is in °F. and P is the oxygen content of the oxidant in volume percent.

5. The process of claims 1, 2, 3 or 4 wherein about 5-10% of the oxidant is directed adjacent to said fuel jet to form an oxidant envelope, thereby creating a flame front and stabilizing the flame.

* * * * *

UNITED STATES PATENT AND TRADEMARK OFFICE
CERTIFICATE OF CORRECTION

PATENT NO. : 4,378,205
DATED : March 29, 1983
INVENTOR(S) : J.E. Anderson

It is certified that error appears in the above-identified patent and that said Letters Patent are hereby corrected as shown below:

In the title, delete "AND".

In column 6, line 48, delete "has" and substitute therefore -- have --.

In column 7, line 9, delete "oxygent" and substitute therefore -- oxygen --.

Signed and Sealed this

Fourteenth Day of June 1983

[SEAL]

Attest:

DONALD J. QUIGG

Attesting Officer  Acting Commissioner of Patents and Trademarks